(12) United States Patent
McCaslin et al.

(10) Patent No.: US 10,285,341 B2
(45) Date of Patent: May 14, 2019

(54) DRIPPER GRIPPER

(71) Applicants: Garry McCaslin, Shafter, CA (US);
Dustin McCaslin, Shafter, CA (US)

(72) Inventors: Garry McCaslin, Shafter, CA (US);
Dustin McCaslin, Shafter, CA (US)

(*) Notice: Subject to any disclaimer, the term of this patent is extended or adjusted under 35 U.S.C. 154(b) by 0 days.

(21) Appl. No.: 15/793,748

(22) Filed: Oct. 25, 2017

(65) Prior Publication Data
US 2018/0042187 A1 Feb. 15, 2018

Related U.S. Application Data

(62) Division of application No. 15/169,293, filed on May 31, 2016.

(60) Provisional application No. 62/168,409, filed on May 29, 2015, provisional application No. 62/292,780, filed on Feb. 8, 2016.

(51) Int. Cl.
*A01G 25/02* (2006.01)
*B05B 15/622* (2018.01)
*A01G 25/00* (2006.01)

(52) U.S. Cl.
CPC .......... *A01G 25/02* (2013.01); *B05B 15/622* (2018.02); *A01G 25/00* (2013.01); *A01G 25/023* (2013.01)

(58) Field of Classification Search
CPC ...... A01G 25/02; A01G 25/023; A01G 25/00; A01G 25/06; B05B 15/622; B05B 15/625; B05B 15/65; A01K 97/10; A47B 17/06
USPC ......... 248/80, 83, 87, 75, 76, 85, 68.1, 67.7, 248/67.5
See application file for complete search history.

(56) References Cited

U.S. PATENT DOCUMENTS

| | | | | |
|---|---|---|---|---|
| 674,161 A | * | 5/1901 | Brown | B05B 15/062 248/87 |
| 980,895 A | * | 1/1911 | Doherty | A62C 31/28 248/76 |
| 1,078,817 A | * | 11/1913 | Austin | B05B 15/062 248/85 |
| 1,128,248 A | * | 2/1915 | Hetzel | B05B 15/062 248/85 |
| 1,233,916 A | * | 7/1917 | Roberts | B05B 15/062 248/87 |
| 1,479,532 A | * | 1/1924 | Coleman | B05B 15/062 248/87 |
| 1,502,822 A | * | 7/1924 | Hill | B05B 1/267 239/513 |

(Continued)

*Primary Examiner* — Nkeisha Smith
(74) *Attorney, Agent, or Firm* — Matthew C. McCartney; Eastman McCartney Dallmann LLP

(57) ABSTRACT

A water line support device includes a pair of stakes that extend perpendicularly downward from a horizontal support member and a plurality of water line retention mechanisms that may be positioned on the top or bottom side of the horizontal member. In simple form, the plurality of integral retention mechanisms have a recessed channel that is oriented parallel to the ground and perpendicular to the horizontal member. The horizontal member has a top side and a bottom side connected on opposite sides of a middle support such that the top side, middle support and bottom side form an I-beam configuration when viewed as a cross section of the horizontal member. The middle support can be reinforced or braced with diagonal supports that also are connected to and support the top side and the bottom side of the horizontal member. A logo can be added to the horizontal support member.

12 Claims, 6 Drawing Sheets

(56) References Cited

U.S. PATENT DOCUMENTS

| | | | | |
|---|---|---|---|---|
| 1,596,752 A * | 8/1926 | Mitchell | ............... | B05B 15/062 119/72 |
| 1,645,500 A * | 10/1927 | Fenton | ................ | A47C 31/026 24/356 |
| 1,763,119 A * | 6/1930 | Hatcher | ................. | B05B 1/267 239/275 |
| 1,992,203 A * | 2/1935 | Gabrielson | ........... | B05B 15/062 248/85 |
| 2,349,505 A * | 5/1944 | Lohne | ................. | B05B 15/062 24/351 |
| 2,463,147 A * | 3/1949 | Bumbaugh | ............ | B22D 15/04 164/357 |
| 2,592,306 A * | 4/1952 | Maze | ..................... | A01K 97/10 248/514 |
| 2,683,008 A * | 7/1954 | Roederer | ............... | A01K 97/10 248/166 |
| 3,473,770 A | 10/1969 | Edgerton | | |
| 3,588,012 A * | 6/1971 | Schaefer | ................ | A01G 25/02 239/276 |
| 3,894,706 A | 7/1975 | Mizusawa | | |
| 4,061,301 A * | 12/1977 | Catend, Jr. | ................ | A45F 3/44 248/156 |
| 4,095,744 A * | 6/1978 | Villelli | .................. | A01G 25/00 239/1 |
| 4,126,012 A | 11/1978 | Waller | | |
| 4,135,668 A | 1/1979 | Winkler | | |
| 4,185,424 A * | 1/1980 | Streit | ..................... | G01C 15/04 119/786 |
| 4,779,800 A * | 10/1988 | Tuomi | .................... | B05B 1/207 239/276 |
| 4,799,641 A | 1/1989 | Koreski | | |
| 4,826,113 A * | 5/1989 | Winters | .................... | F16L 3/18 248/228.3 |
| 4,850,555 A | 7/1989 | Lemkin | | |
| 4,944,476 A | 7/1990 | Olson | | |
| D319,474 S * | 8/1991 | Steiner | ........................... | D20/22 |
| 5,372,457 A | 12/1994 | Rante | | |
| 5,427,346 A * | 6/1995 | Urgola | ..................... | A45C 9/00 135/16 |
| 5,437,449 A * | 8/1995 | Zink | ..................... | A63B 55/10 248/156 |
| 5,595,363 A * | 1/1997 | De Leebeeck | ............ | F16L 3/24 248/72 |
| 6,276,644 B1 * | 8/2001 | Jennings | ................... | F16L 3/04 248/49 |
| 6,305,057 B1 * | 10/2001 | Seum | ....................... | B60N 2/48 24/114.4 |
| 6,332,595 B1 * | 12/2001 | Klucznik | .............. | F16L 1/0246 248/80 |
| 6,523,292 B2 * | 2/2003 | Slavik | ...................... | G09F 3/20 248/274.1 |
| 6,527,246 B1 | 3/2003 | Stinnett | | |
| 7,434,360 B2 * | 10/2008 | Traub | ..................... | A01G 1/08 47/33 |
| 7,469,865 B2 | 12/2008 | Mayorga | | |
| 8,002,126 B1 * | 8/2011 | Drum | ..................... | A01K 97/08 211/195 |
| 8,418,414 B2 * | 4/2013 | Nelson | .................. | E04H 4/0075 248/315 |
| 8,505,859 B2 | 8/2013 | Leung | | |
| 9,291,288 B2 * | 3/2016 | Simmons | .................. | F16L 3/24 |
| 9,400,117 B2 * | 7/2016 | Jacobs | .................... | F24D 3/141 |
| 9,631,355 B1 * | 4/2017 | Taraszkiewicz | ........ | E03F 1/008 |
| 2003/0150963 A1 | 8/2003 | Doring | | |
| 2005/0184203 A1 | 8/2005 | Votypka | | |
| 2014/0284433 A1 | 9/2014 | Gazlay | | |
| 2014/0374547 A1 | 12/2014 | Langenderfer | | |
| 2015/0204549 A1 * | 7/2015 | Jacobs | ................... | F24D 3/141 248/68.1 |
| 2001/6006656 | 3/2016 | Boudwin | | |

\* cited by examiner

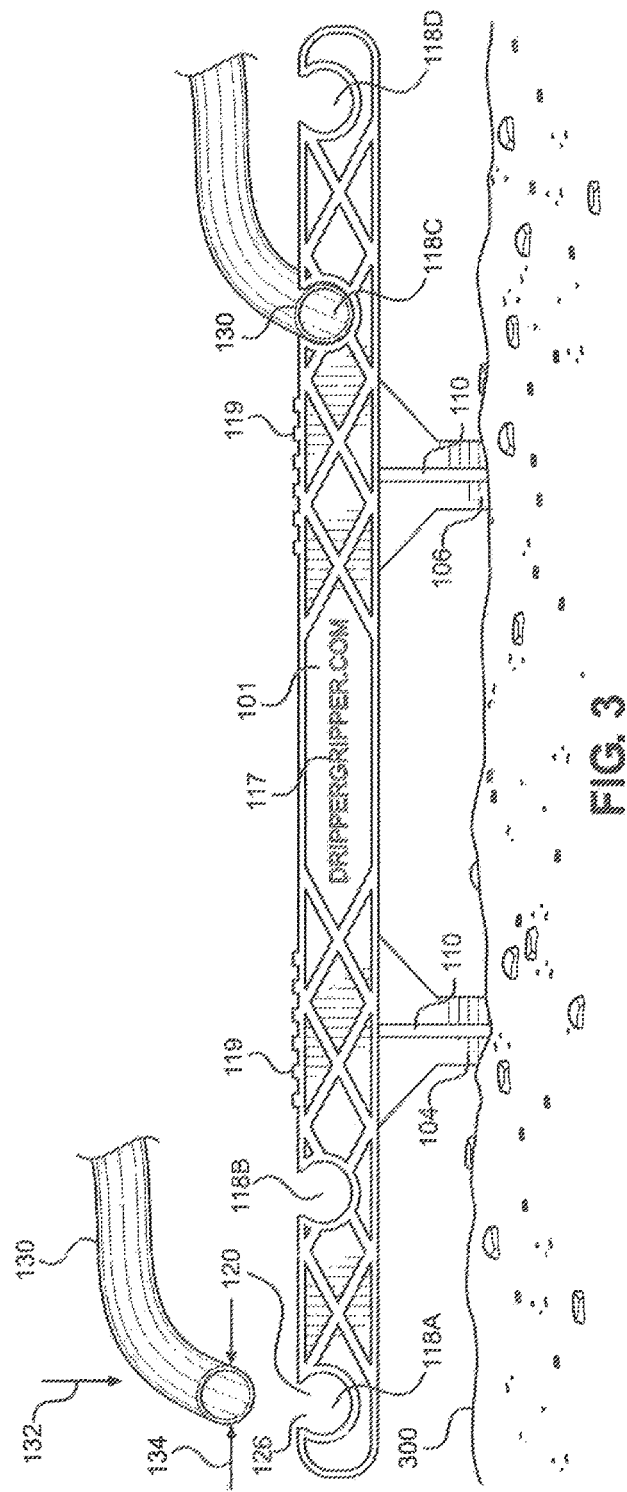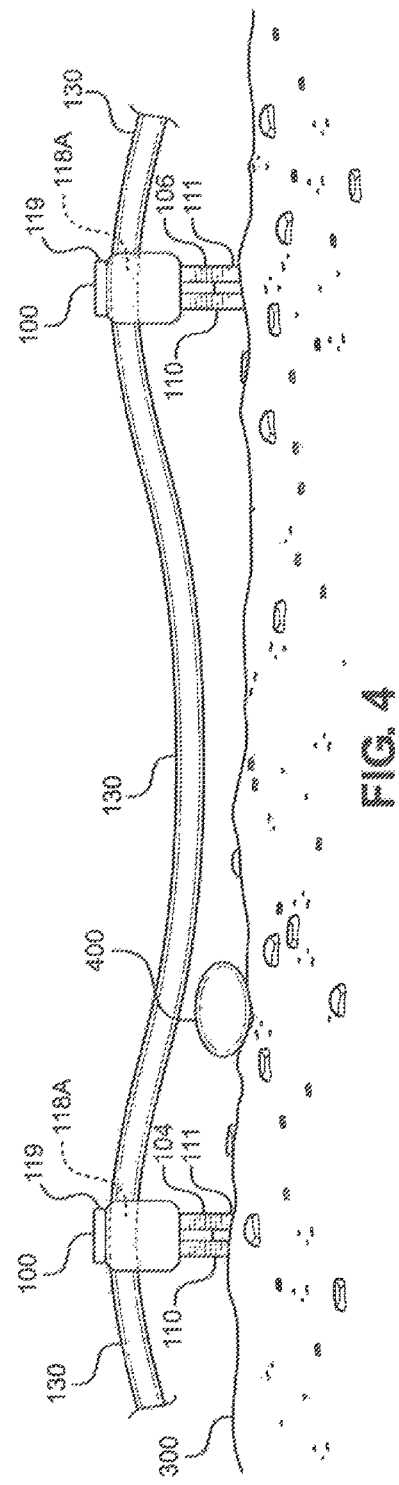

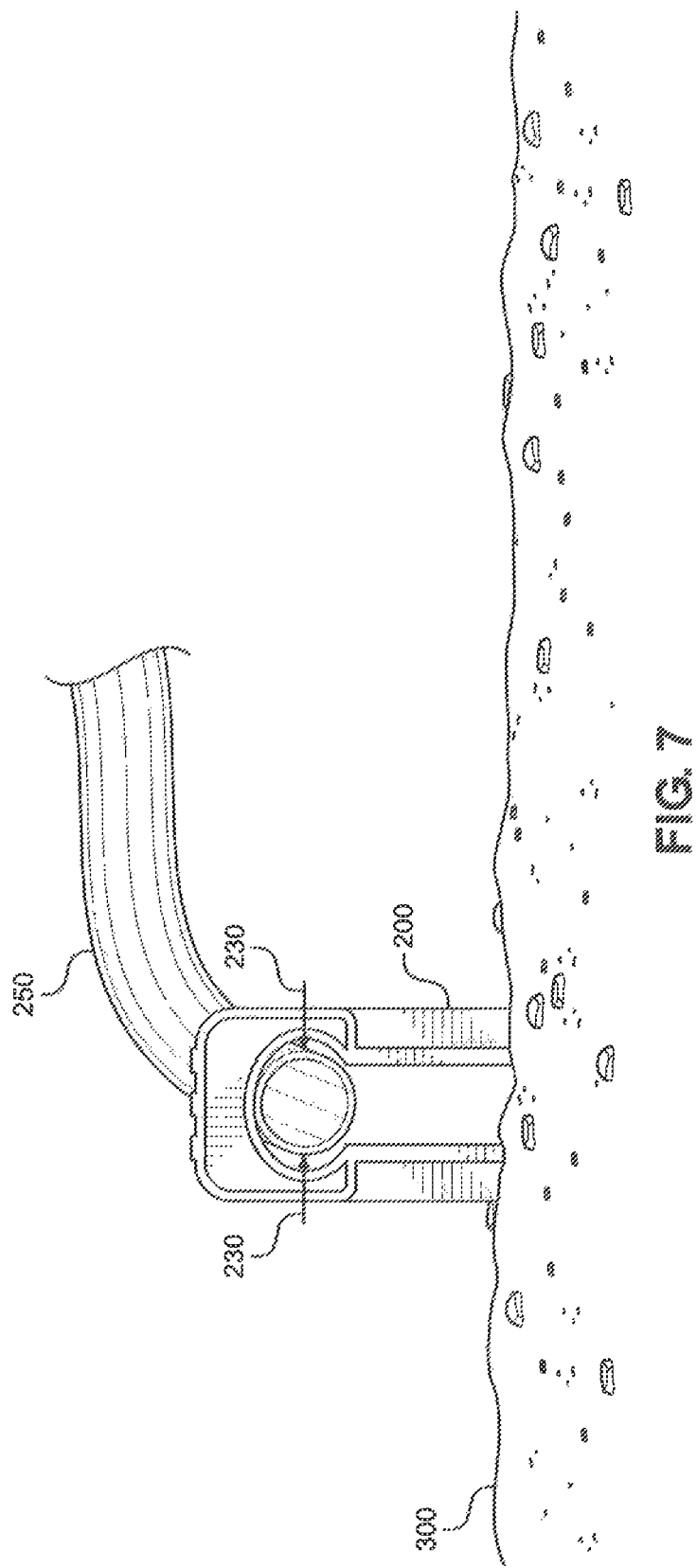

DRIPPER GRIPPER

RELATED APPLICATIONS

This application is a divisional of, and claims the benefit of priority to, the U.S. Patent Application for "Dripper Gripper," Ser. No. 15/169,293, filed on May 31, 2016 currently co-pending. That patent application is a conversion of, and claims the benefit of priority to, the U.S. Provisional Patent Application for "Dripper Gripper," Ser. No. 62/168,409, filed on May 29, 2015, and also is a conversion of, and claims the benefit of priority to, the U.S. Provisional Patent Application for "Dripper Gripper," Ser. No. 62/292,780, filed on Feb. 8, 2016. The three referenced applications are incorporated fully herein by this reference.

FIELD OF INVENTION

The present invention relates to an agricultural support device and system. More particularly, the present invention pertains to a water line support device that is driven into the ground. The invention may securely retain water lines along the ground in an orderly fashion and resist unwanted rotation and tangling of water lines. Additionally, the water line support device has a plurality of water line retention mechanisms for retaining individual water lines therein, and a pair of stakes that secure the device to the ground. The invention provides the users with a superior means of retaining and supporting hose and water lines.

BACKGROUND OF INVENTION

The present invention relates to a water line support device. In many farm, orchard, and agricultural estates, water and other fluids need to be transported and delivered to plants and vegetation far from a water source. Typically, hoses and water lines are utilized to deliver the water from the source to sprinklers in the fields. The sprinklers then disperse the water onto the desired area. Various water and hose line retention devices can be used to organize and arrange the various lines. It is important to organize the hoses to ensure that the hoses are not destroyed by tractors or other vehicles that my run over the hoses. Farmers often bury the hoses to keep them in place out of path of travel of tractors. However, the practice of burying the irrigation hoses often leads to damage from pests, such as gophers.

Over the years, there have been other variations of hose and water line retention devices. Most commonly, these devices include a stake member that is driven into the ground, while at the same time is rigid and removable. These devices generally comprise a rigid metal stake with a substantially pointed end that is configured for insertion into the ground, and which have a retention mechanism adapted to retain a water line. These metal stakes are prone to failure from rust or metal fatigue.

Hose and water line retention devices are frequently inserted manually into the ground with the stake end facing downwardly. The user may then selectively insert a hose or water line within the retention mechanism. The hose and water lines are typically tubular, hollow, and flexible cylinders that are adapted to transport and house fluid therein. Hoses and water lines may be attached to a water source, such as a spigot at a first end, and to a dispensing apparatus, such as a sprinkler at the second end. The hose and water line retention devices are selectively placed between the two ends to prevent them from twisting. The retention devices also enable a farmer to organize the lines in such a way as to ensure that tractors and other vehicles do not unnecessarily run over and damage the water line. In addition, the retention devices enable a farmer to more precisely deliver the fluid contents to a desired location, wasting less water in the process.

While these known prior art retention devices are a convenient way to retain hose and water lines, they do not work very well with certain gauge/capacity water lines because when large volumes of water flow through hoses, it exerts a force on the single stake retention device that may dislodge the hose from the device and/or remove the stake from the ground. Heretofore, various forms water line retention devices have been constructed with retention mechanisms and stakes. These prior art devices are typically single stake devices with a single retention mechanism located on the side or underside of the device. These devices, however, do not allow for multiple hose and water lines to be individually secured within a plurality of retention mechanisms on the same device.

Therefore, where there is a need to use multiple water lines, such as in a commercial orchard, the prior art retention devices lack the ability to retain multiple lines within the same device. This in turn requires installation of more retention devices and less organization. An additional shortcoming of the prior art is the relative location of the retention mechanism on the prior art devices, which are not in an optimal location for retaining, securing, and changing a water line held therein.

In light of the above, it would be advantageous to provide a water line support device with multiple stakes capable of retaining multiple lines within the same device. It would be further advantageous to provide to a water line support device with an optimal location for securely retaining a water line held therein while also facilitating easy removal and insertion of a water line in the water line support device.

SUMMARY OF THE INVENTION

The present invention offers a water line support device that includes a pair of stakes that extend perpendicularly downward from a horizontal support member and a plurality of water line retention mechanisms. The plurality of retention mechanisms may be positioned on the top side of the horizontal member. In simple form, the plurality of integral retention mechanisms have a recessed channel that is oriented parallel to the ground and perpendicular to the horizontal member.

The horizontal member has a top side and a bottom side connected on opposite sides of a middle support such that the top side, middle support and bottom side form an I-beam configuration when viewed as a cross section of the horizontal member. The middle support can be reinforced or braced with diagonal supports that also are connected to and support the top side and the bottom side of the horizontal member. A logo can be added to the horizontal support member.

In an embodiment, the stakes are positioned with respect to one another so as to trifurcate the horizontal support member into three equal portions; a first third portion, a second third portion and a middle third portion. The stakes have an elongated member with a substantially pointed distal end that is adapted to penetrate and remain in the ground. The stakes are connected to the bottom side of the horizontal member, opposite the substantially pointed distal end of the elongated member. Stake flare supports can optionally be provided to connect the elongated body of the stakes and bottom side of the horizontal support member.

The stakes may also be provided with a projected member that runs along the length of the elongated member. In an embodiment, a projected member can be provided on either side of the elongated member such that the two projected members coupled with the elongated member form an "x" cross section in the stake. A striking surface texture is provided on the top side of the horizontal support member opposite the stakes to enable a user to easily drive the stakes into the ground using a foot or tool such as a hammer.

The integral retention mechanisms have a recessed channel that has a hollow partially complete circle within the middle support of the horizontal member that has an entrance way through an aperture in the top side of the horizontal member. Alternatively, or additionally, the integral retention mechanisms may be formed on the bottom side of the horizontal member. The entrance way has two curved members that are biased towards each other. In use, a water line is deformed to pass the two curved members so as to rest in the recessed channel. As the water line expands to its original circular geometry, it is retained in the recessed channel by the two curved members. In one embodiment, the integral retention mechanisms are located within the first third portion and second third portion of the horizontal member.

In an alternative embodiment, the present invention offers a water line support device that has two stakes connected together at a body with a hose or water line receiving aperture located in the body between the two stakes. The hose or water line receiving aperture has a reinforced surface. The top of the reinforced surface has a textured surface for striking with a foot, hammer or other tool when driving the alternative water line support device into the ground.

The stakes extend away from the body and are substantially parallel to one another to define a channel. The channel of the stakes has an inner edge formed with a reinforced rail that extends along the surface of each stake and also an interior wall of the aperture in the body. The stakes are formed with pointed tips that enable the water support device to be easily driven into the ground when struck at the textured surface.

In use, the stakes are flexed at the body to an open position to enable a user to pass a water line or hose through the channel and into the hose or water line receiving aperture. The stakes then return to their original un-flexed position and retain the water line within the hose or water line receiving aperture. The stakes are held in the original un-flexed position when driven into the ground, thus securing the hose or water line within the hose or water line receiving aperture.

BRIEF DESCRIPTION OF DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3 is a front plan view of the hose and water line support device of the present invention showing a first hose being positioned above an integral retention mechanism and showing a second hose within an integral retention mechanism;

FIG. 4 is a side view of a first hose and water line support device and a second hose and water line support device and showing a hose secured in an integral retention mechanism in each device such that the hose is firmly held above ground to enable an almond to pass freely beneath the hose;

FIG. 7 is a front view of the alternative embodiment shown in FIGS. 5 and 6 and showing the hose and water line support device secured in the ground by its takes and securely holding a hose within the aperture.

DETAILED DESCRIPTION OF A PREFERRED EMBODIMENT

Figure 1:
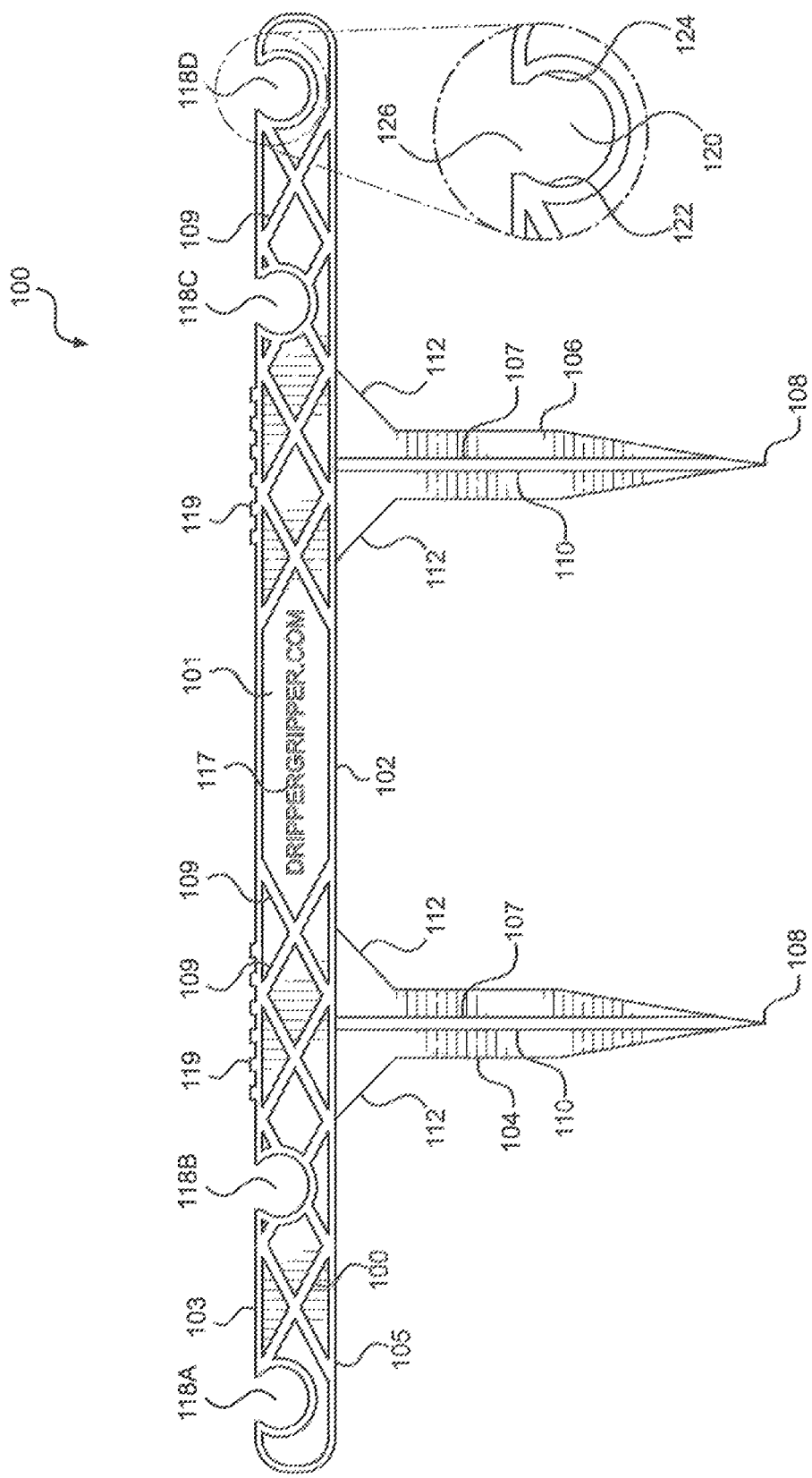
FIG. 1 is a front view of the hose and water line support device of the present invention showing the two separate stakes extending from the body and having a point to facilitate positioning of the hose and water line support device into the ground.
Figure 2:
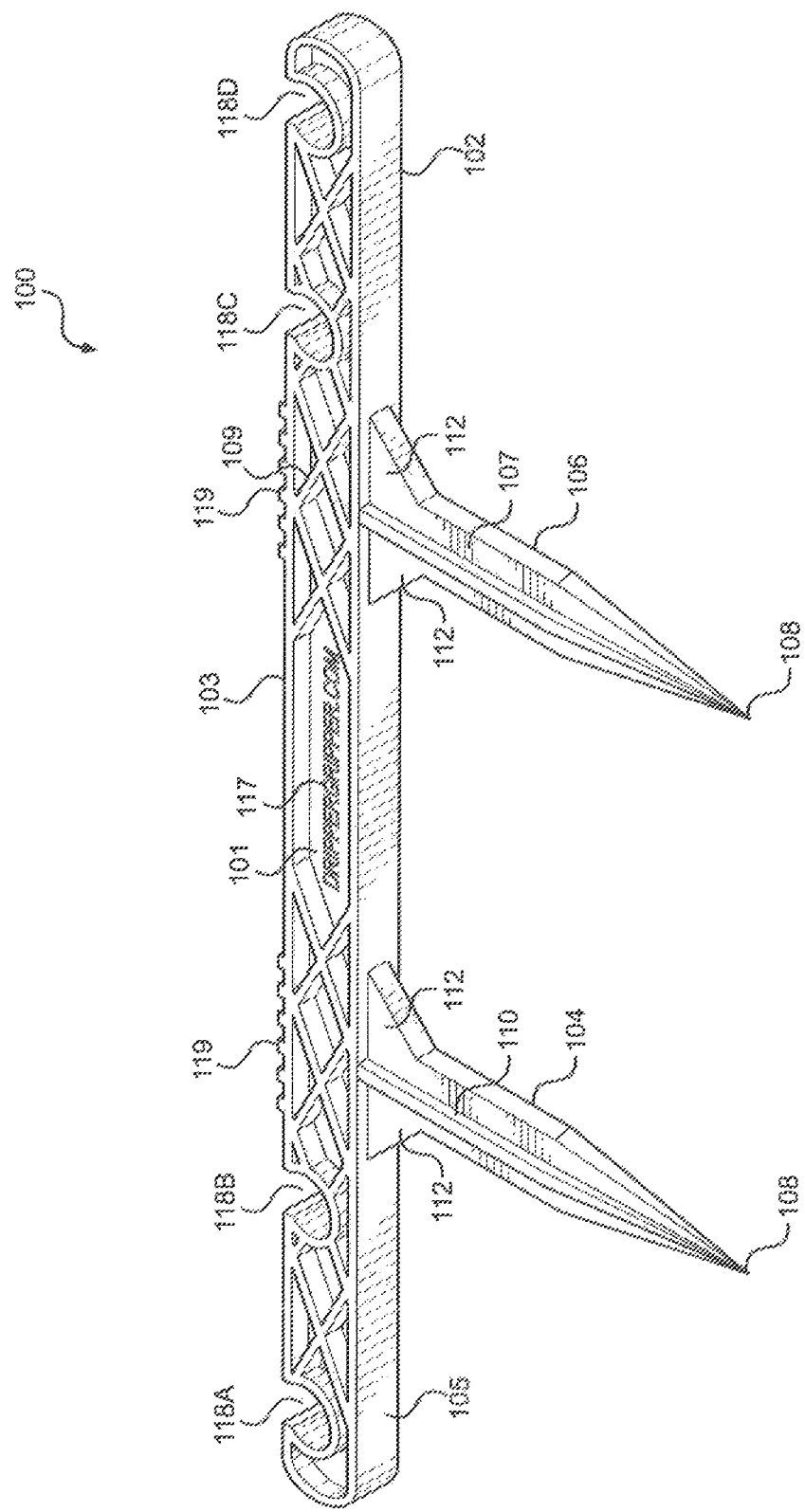
FIG. 2 is a lower perspective view of the hose and water line support device of the present invention showing a body having two stakes apart and extending perpendicular from the body and tapered to a point to facilitate insertion of the hose and water line support device of the present invention into position on the ground, and also formed with multiple hose-receiving apertures sized to securely receive a hose or water line and maintain that hose or water line above the ground.

Referring now to FIG. 1 and FIG. 2, there is shown a front view and lower perspective view of the hose and water line support device 100. The hose and water line support device 100 comprises a horizontal support member 102 having a top side 103 and a bottom side 105 connected on opposite sides of a middle support 101 such that the top side 103, middle support 101 and bottom side 105 form a typical I-beam configuration. A first stake 104 and a second stake 106 each extend perpendicularly downward from the bottom side 105 of horizontal support member 102. In an embodiment, first stake 104 and second stake 106 are positioned with respect to one another so as to trifurcate the horizontal support member 102 into three equal portions; a first third portion, a middle third portion and a final third portion. Overall, the device is shaped like the Greek letter "π" (Pi). Middle support surface 101 is shown braced with diagonal supports 109. Diagonal supports 109 also support the top side 103 and bottom side 105 of horizontal support member 102. A logo 117 can also be placed on middle support surface 101.

First stake 104 and second stake 106 each is comprised of an elongated member 107 with a substantially pointed distal end 108 that is adapted to penetrate and remain in the ground 300. The elongated member may have a circular, rectangular, or polygonal cross section. A projected member 110, disposed toward each distal end 108 of stakes 104 and 106, serves to increase the frictional engagement between the stakes 104 and 106 and ground 300, and provide resistance to uplifting forces. A second projected member 111 (not shown) can be located on stakes 104 and 106 on the opposite side of projected member 110. The elongated member 107 coupled with projected member 110 and second projected member 111 form "X" shaped cross sectional area for stakes 104 and 106. Stakes 104 and 106 can also be equipped with stake flare supports 112 opposite distal end 108. Stake flare supports 112 ensure strong bond between horizontal support member 102 and stakes 104 and 106. The stake flare supports 112 coupled with projected member 110 also increase the torsional rigidity of the stakes 104 and 106 to decrease risk of rotation of the horizontal support member 102 with respect to stakes 104 or 106. The hose and water line support device 100 may be constructed from plastic, metal, wood, or other similarly semi-rigid material. The first and second stakes 104 and 106 are adapted to secure the hose and water line support device 100 to the ground 300.

The horizontal support member 102 has a plurality of integral retention mechanisms 118A, 118B, 1180 and 118D. The plurality of integral retention mechanisms 118A, 118B, 1180 and 118D are each sized to receive and secure a drip line, water line, and the like. In an embodiment, integral retention mechanisms 118A and 118B are located in the first third portion of the horizontal support member 102. Similarly, integral retention mechanisms 1180 and 118D are located in the final third portion. Each integral retention mechanism 118A, 118B, 118C, 118D consists of a recessed channel 120 that is oriented perpendicular to the horizontal member 102 and parallel to the ground 300 (Shown in FIGS. 3 and 4). This recessed channel 120 fog a hollow, partially complete circle that has an entrance way. The entrance way consists of a pair of curved members 122 and 124 biased toward each other, and a recess channel 120 accessible by an aperture 126 on the top side 103 of the horizontal member 102.

The top surface 103 of the horizontal support member 102 has striking surface texture 119 located opposite the first and second stakes 104 and 106 making the hose and water line support device 100 adapted to be stepped on or otherwise pressed downwardly. The striking surface texture 119 also provides a user with a visual target to strike with a hammer or his or her foot when driving stakes 104 and 106 into the ground 300 as well as increase friction to prevent slippage of the hammer head or foot when striking the hose and water line support device 100.

Referring now to FIG. 3, in operation, stakes 104 and 106 are pressed into the ground 300 by apply pressure on striking surfaces 119. When inserted into the ground, the pair of stakes 104 and 106 resist rotational and torsional forces that may act against the hose and water line support device 100. Next, the retaining mechanisms 118A, 118B, 1180 and 118D receive a tubular member therein, such as an irrigation hose 130. Sufficient pressure is applied to the hose 130 in direction 132 such that the walls of irrigation hose 130 are deformed in directions 134 when passing through aperture 126 in retaining mechanism 118A. Once the hose 130 has passed through the aperture 126, the hose 130 returns to its original configuration and rests securely within the recessed channel 120.

The inclusion of multiple retention mechanisms 118 on the first third and the final third of the horizontal support member 102 provides the ability to move drip lines after the hose and water line support device 100 has been secured to the ground 300. More specifically, irrigation hoses 130 can initially be placed in support members 118E and 1180 and then as the irrigated trees and their roots grow beyond the location of irrigation hoses 130, those irrigation hoses 130 can be moved from support members 118E and 1180 to 118A and 118D respectively to allow irrigation water to again reach the grown roots of the trees.

Referring now to FIG. 4, a first hose and water line support device 100 is shown connected to a second hose and water line support device 100 by way of hose 130. The hose 130 is held sufficiently above ground 300 to enable nut 400 to pass underneath the hose 130 without interference from the hose 130. In addition, the act of holding hose 130 above or on the ground reduces the likelihood of gopher damage to the hose 130.

Figure 5:
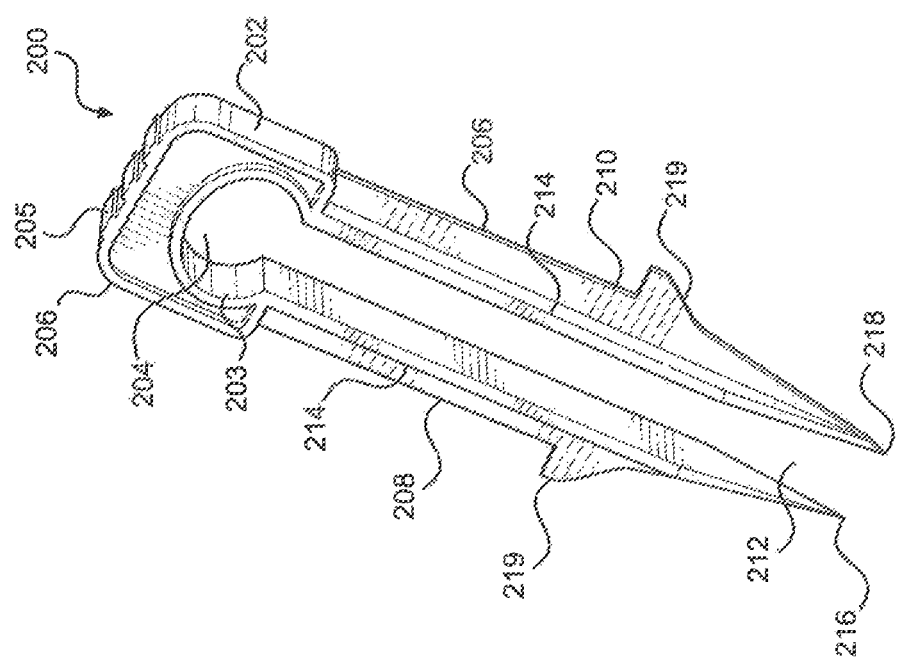
FIG. 5 is an isometric view of an alternative embodiment of the present invention that includes a body formed with a hose or water line receiving aperture.

Referring now to FIG. 5, a single hose and water line support device of the present invention is shown and generally designated 200. Hose and water line support device 200 includes a body 202 formed with a hose or water line receiving aperture 204 and having a reinforced surface 206 to provide a region of the device 200 capable of withstanding the pounding of the device into the soil. The top of the reinforced surface 206 has textured surface 205.

Extending away from body 202 are a pair of stakes 208 and 210 which are substantially parallel and spaced apart to define a channel 212. The stakes 208 and 210 adjacent the inner edge of channel 212 are formed with a reinforced rail 214 to provide additional strength to the device 200 as it is inserted into the soil. The reinforced rail 214 extends along the inner surface of each stake 208 and 210 as well as the interior wall 203 of aperture 204. Additionally, stakes 208 and 210 are formed with pointed tips 216 and 218 respectively to facilitate the placement of the stakes into the soil 300.

Figure 6:
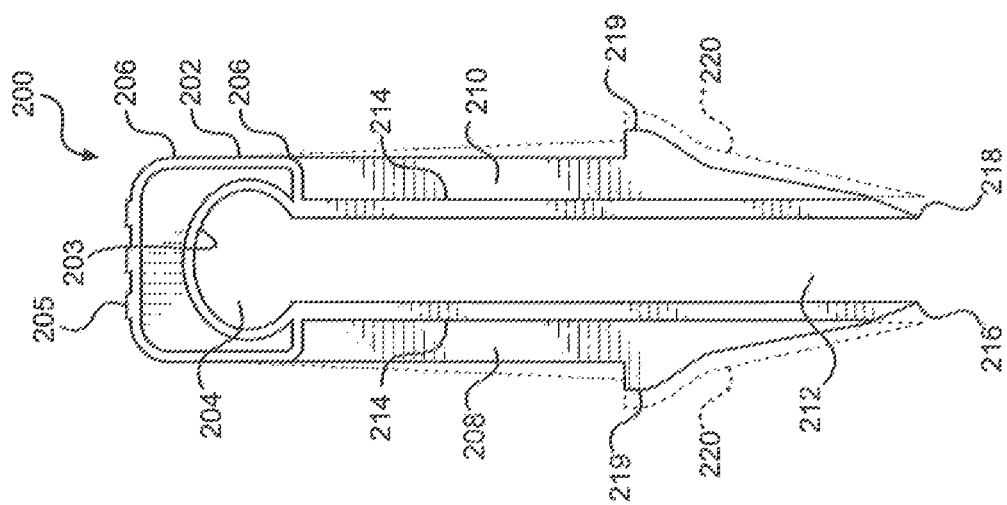
FIG. 6 is a front view of the alternative embodiment shown in FIG. 5 and showing stakes flexing at body to an open position to allow placement of a hose into the aperture.

From FIG. 6 it can be appreciated that stakes 208 and 210 can flex at body 202 to an open position 220 (shown in dashed lines) to facilitate the placement of the hose or water line within the device 200. With this flexibility, a hose or water line 250 can be positioned on the ground, and the hose and water line support device 200 may be positioned over the hose or water line, separated to accept the hose or waterline within channel 212 and into position within the aperture 204 of body 202.

In application, device 200 is used as shown in FIG. 7. A hose or water line 250 is shown positioned in aperture 204 of device 200. In order to place the hose or water line 250 into aperture 204, the stakes 208 and 210 are first flexed to open position 220 as shown in FIG. 6. Once flexed into the open position 220, the hose or water line 250 easily is passed up through channel 212. The hose or water line 250 is then compressed in direction 230 to enable the hose or water line 250 to pass into aperture 204. Next, the stakes 208 and 210 are placed into soil 300, such as by pounding on the reinforced area 206 at textured surface 205 of the device 200 driving it into the soil 300. It is not necessary to completely bury stakes 208 and 210. The hose or water line 250 is held securely within aperture 204 or device 200.

Figure 8:
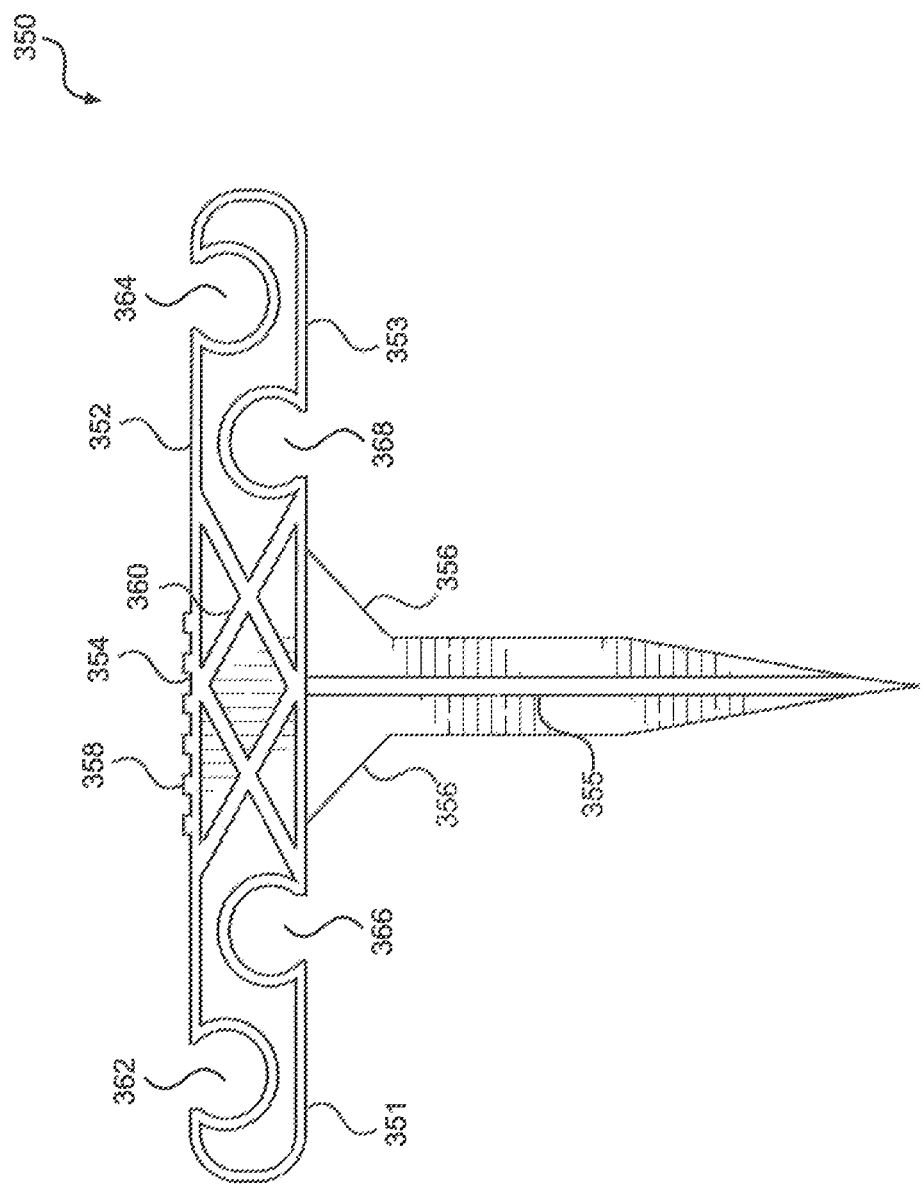
FIG. 8 is a front view of an alternative embodiment of the hose and water line support device of the present invention having a body formed with integral retention mechanisms formed on both the upper and lower side of the body and showing a single stake extending from the body and having a point to facilitate positioning of the hose and water line support device into the ground.

Referring now to FIG. 8, an alternative embodiment of the hose and water line support device generally designated 350. Hose and water line support device 350 comprises a horizontal support member 351 having a top side 352 and a bottom side 353 connected on opposite sides of a middle support 354 such that the top side 352, middle support 354 and bottom side 353 form a typical I-beam configuration. A first stake 355 extends perpendicularly downward from the bottom side 353 of horizontal support member 351. Middle support surface 351 is shown braced with diagonal supports 360. Diagonal supports 360* also support the top side 354 and bottom side 353 of horizontal support member 351.

Stake 355 is comprised of an elongated member, as was more fully discussed above, with a substantially pointed distal end that is adapted to penetrate and remain in the ground.

The horizontal support member 351 has a plurality of integral retention mechanisms 362 and 364 formed adjacent the top side 352, and 366 and 368 formed adjacent the bottom side 353. The plurality of integral retention mechanisms 362, 364, 366, 368 are each sized to receive and secure a drip line, water line, and the like. Each integral retention mechanism 362, 364, 366, 368, as more fully described above, consists of a recessed channel that is oriented perpendicular to the horizontal member 351 and parallel to the ground 300 (Shown in FIGS. 3 and 4).

As more fully discussed above, this recessed channel forms a hollow, partially complete circle that has an entrance way. The entrance way consists of a pair of curved members biased toward each other, and a recess channel accessible by an aperture 126 on the top side 103 of the horizontal member 102. The placement of integral retention mechanisms 366 and 368 on the bottom side 353 provide a measure of safety when excessive force is applied downward on a retained hose or water line, such as when stepped on or driven over with farming equipment. In those circumstances, the hose or water line can disengage from the integral retention device due to the deformation of the hose or water line to exit the recess channel. This avoids excessive forces being applied to the hose and water line support device 350, thereby reducing breakage in the field.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated. While there have been shown what are presently considered to be the preferred embodiment of the present invention, it will be apparent to those skilled in the art that various changes and modifications can be made herein without departing from the scope and spirit of the invention.

What we claim is:

1. A support device comprising:
a horizontal support member with a top side and a bottom side connected on opposite sides of a middle support such that the top side, middle support, and bottom side form an i-beam configuration;
a first stake and a second stake, each connected to and extending from the bottom of the horizontal support member spaced apart so as to trifurcate the horizontal support member into a first third portion, a second third portion and a middle third portion between the first third portion and the second third portion;
a first integral retention mechanism having an entrance way in the top side of the horizontal member and a recessed channel located in the middle support sized to receive and secure a first drip line and located in the first third portion of the horizontal support member; and
a second integral retention mechanism having an entrance way in the top side of the horizontal member and a recessed channel located in the middle support sized to receive and secure a second drip line and located in the second third portion of the horizontal support member wherein the horizontal member is braced with a plurality of diagonal supports which are connected to and reinforce the top side and the bottom side of the horizontal support member and wherein at least one of the diagonal supports is connected to and reinforces the first integral retention mechanism and wherein at least one of the diagonal supports is connected to and reinforces the second integral retention mechanism.

2. The support device of claim 1 further comprising a logo placed on the middle support of the horizontal support member.

3. The support device of claim 1 wherein the top surface of the horizontal member has a striking surface texture located opposite the first and second stakes.

4. The support device of claim 3 wherein the striking surface texture provides a visual target to strike.

5. The support device of claim 3, wherein the striking surface texture provides friction to prevent slippage during installation.

6. The support device of claim 1 wherein the stakes each has an elongated member with a pointed distal end that is adapted to penetrate a ground surface.

7. The support device of claim 1 wherein each retention mechanism further comprises a recessed channel having a partially complete circle with an entrance way and wherein the recessed channel is accessible by an aperture on the top of the horizontal member.

8. The support device of claim 1 wherein the entrance way of each recessed channel further comprises a pair of curved members biased towards each other.

9. A support device comprising:
a horizontal support member with a top side and a bottom side connected on opposite sides of a middle support such that the top side, middle support, and bottom side form an i-beam configuration;
a first stake and a second stake, each connected to and extending from the bottom of the horizontal support member spaced apart so as to trifurcate the horizontal support member into a first third portion, a second third portion and a middle third portion between the first third portion and the second third portion and wherein each stake terminates in a pointed distal end;
a first integral retention mechanism having an entrance way in the top side of the horizontal member and a recessed channel located in the middle support sized to receive and secure a first drip line and located in the first third portion of the horizontal support member;
a second integral retention mechanism having an entrance way in the top side of the horizontal member and a recessed channel located in the middle support sized to receive and secure a second drip line and located in the second third portion of the horizontal support member wherein the horizontal member is braced with a plurality of diagonal supports which are connected to and reinforces the top side and the bottom side of the horizontal support member and wherein at least of the diagonal supports is connected to and reinforces the first integral retention mechanism and wherein at least one of the diagonal supports is connected to and reinforces the second integral retention mechanism; and
wherein each recessed channel further comprises a reinforced curved surface formed within the middle support with a first end and a second end biased towards one another at the entrance way.

10. The support device of claim 9 wherein each stake further comprises a first projected member on a first side of the stake and a second projected member on an opposite second side of the stake.

11. The support device of claim 10 wherein the first projected member and the second projected member each has a first end connected to the bottom side of the horizontal support and a second end tapering to the pointed distal end of each stake.

12. A support device comprising:
   a horizontal support member with a top side and a bottom side connected on opposite sides of a middle support such that the top side, middle support, and bottom side form an i-beam configuration;
   a first stake and a second stake, each connected to and extending from the bottom of the horizontal support member spaced apart so as to trifurcate the horizontal support member into a first third portion, a second third portion and a middle third portion between the first third portion and the second third portion;
   a first integral retention mechanism having an entrance way in the top side of the horizontal member and a recessed channel located in the middle support sized to receive and secure a first drip line and located in the first third portion of the horizontal support member wherein the first drip line must be deformed to pass through the entrance way of the first integral retention mechanism; and
   a second integral retention mechanism having an second entrance way in the top side of the horizontal member and a second recessed channel located in the middle support sized to receive and secure a second drip line and located in the second third portion of the horizontal support member wherein the second drip line must be deformed to pass through the entrance way of the second integral retention mechanism.

* * * * *